US007212621B1

(12) United States Patent
Wallenius et al.

(10) Patent No.: US 7,212,621 B1
(45) Date of Patent: May 1, 2007

(54) FEATURE INTERACTIONS

(75) Inventors: Jukka Wallenius, Helsinki (FI); Sami Uskela, Helsinki (FI)

(73) Assignee: Nokia Corporation, Espoo (FI)

( * ) Notice: Subject to any disclaimer, the term of this patent is extended or adjusted under 35 U.S.C. 154(b) by 738 days.

(21) Appl. No.: 10/111,324

(22) PCT Filed: Sep. 28, 2000

(86) PCT No.: PCT/EP00/09616

§ 371 (c)(1),
(2), (4) Date: Sep. 30, 2002

(87) PCT Pub. No.: WO01/31935

PCT Pub. Date: May 3, 2001

(30) Foreign Application Priority Data

Oct. 22, 1999 (GB) ................. 9925070.6

(51) Int. Cl.
*H04M 7/00* (2006.01)
(52) U.S. Cl. .............. 379/221.01; 379/221.1; 379/221.12; 379/230
(58) Field of Classification Search .......... 379/221.09, 379/221.1, 221.12, 230
See application file for complete search history.

(56) References Cited

U.S. PATENT DOCUMENTS 5,153,909 A * 10/1992 Beckle et al. .......... 379/265.03
5,966,434 A * 10/1999 Schafer et al. ......... 379/201.01
6,560,326 B1 * 5/2003 Clark .................... 379/221.09

FOREIGN PATENT DOCUMENTS

| EP | 0578964 | 1/1994 |
| WO | 9707637 | 2/1997 |
| WO | 9750232 | 12/1997 |

OTHER PUBLICATIONS

"Open AIN Operations Strategies" Jerry C. Chen, Proceedings of the Network Operations and Management Symposium (NMOS), US New York IEEE, vol. Symp. 4, pp. 140-152; Publication Date Feb. 14, 1994.

* cited by examiner

*Primary Examiner*—Quynh H. Nguyen
(74) *Attorney, Agent, or Firm*—Ware, Fressola, Van Der Sluys & Adolphson, LLP

(57) ABSTRACT

The present invention relates to a telecommunications system and method for providing a plurality of services, the services providing control for communication via the telecommunications system. The system comprises a switching point for triggering one or more services of said plurality of services for a communication. Each of the services may reserve at least one control characteristic. A service manager connected to the switching point is arranged to determine if at least two services can be provided for the communication based on information relating to control characteristics of said at least two services. A new service can be started only if the control characteristics it requires are not reserved by a previously invoked service. A service manager for use in a telecommunication system for managing the plurality of services is also disclosed.

63 Claims, 10 Drawing Sheets

```
SSP              MANAGER ADAPTER            SERV 1         SERV 2
```

*Triggering (user-id)*
`-------------->`

*(user-id)* `-->`
                *SERV1, SERV2*

*request*
                `----------->`

*request*
                                `----------->`

`<------` *intermediate responses* `------>`

*final response*
                              `<-----------`

*final response, control classes (CL-1, CL-2,...)*
                `<-------------`

*request*
                `------------->`

*request*
                              `------------------------->`

`<------` *intermediate responses* `------------------->`

*final response*
                              `<-------------------------`

*final response, control classes (CL-3, CL-4,...)*
                `<-------------`

*compiled final response (like continue,*
*connect, release call,...)*
`<---------------`

FIG. 11

FEATURE INTERACTIONS

CROSS-REFERENCE TO RELATED APPLICATIONS

Priority is claimed from International Application PCT/EP00/09616 filed Sep. 28, 2000, which in turn claims priority from Great Britain Application GB 9925070.6, filed Oct. 22, 1999.

FIELD OF THE INVENTION

The present invention relates to provision of communication control in a telecommunications system.

BACKGROUND OF THE INVENTION

A telecommunication system may be arranged to provide a fixed line connection for a calling subscriber. According to another possibility the communication is based on a wireless, such as a radio frequency connection between the subscriber and at least one network element of the telecommunications system. An example of the first mentioned is the public switched telephone network (PSTN), and an example of a wireless radio communication network is the public land mobile network (PLMN). In addition, a communication may be established over one or more data networks. An example of this is the voice over IP (Internet Protocol) arrangement enabling voice call over a packet switched data network. The system may also employ a combination of wireless, fixed line and data communication for a connection. In the following the term "connection" is to be understood to mean all types of communication connections from and/or to a user terminal, such as a voice or multimedia call or a data communication session.

Telecommunication networks typically operate in accordance with a given standard which sets out what the elements of the network are permitted to do and how that should be achieved. In addition to basic voice and data services, the users of the subscriber terminals (such as fixed line telephones, data processing devices or PLMN mobile stations), would like to have other services available. Examples of these additional services include voice mail, the forwarding of a call to a different telephone (e.g. when the mobile station is switched off or the terminal is involved in a different call), prepaid charging, various alerts provided to the user via his/her terminal, caller identity presentation, number to name translations and vice versa, virtual private numbering and so on. The additional services requested and subsequently invoked for a connection may require control of at least one of the functionalities of the connection (routing, charging, duration, provision of connection or user related data and so on). A service providing a control functionality affecting a connection will be referred to in the following as a controlling service. The controlling service is a service provided with an authority to issue control instructions (such as modification of connection instance data, connection manipulation, charging or routing or duration control) for the same connection.

A modern telecommunication system may be provided with the so called intelligent network (IN) concept. The term "intelligent network" was introduced by the BELLCORE organisation (USA) in the mid eighties. The IN concept was developed in order to increase the flexibility and competitiveness of the telecommunication network architecture. Even though the initial IN architectures were developed to implement only certain specific services, for example service number, the current IN solutions provide the telecommunication network operators with a possibility to implement new, powerful services in their networks in a fast and cost-effective manner. The basic principles and operation of the IN applications are well known, and therefore they are not described herein in more detail. It is sufficient to note that in general the IN architecture comprises a (service) switching point (SSP) for triggering a call to the IN services and a (service) control point (SCP) for providing the service. A more detailed description of the general IN concept can be found e.g. from the recommendations by the International Telecommunications Union (ITU-T), such as IN Capability Set CS-1 published in 1993. The IN concept can be implemented in the fixed land line networks, such as the public switched telephone network (PSTN), or the wireless radio communication networks, such as the public land mobile network (PLMN).

For example, in the currently proposed intelligent network (TN) architecture for mobile telecommunication systems, an enquiry for instructions is issued from a mobile services switching centre (MSC) to an external service control point (SCP; the service provider). The signalling between the MSC and the SCP is commonly based on the Signalling System No. 7 (SS7) protocol suite. The interface between the mobile services switching centre and the service control point may be in the intelligent network application protocol (INAP) or the customised applications for mobile network enhanced logic (CAMEL) application part (CAP) protocol. Where an open CORBA (common object request broker architecture) interface is provided, the CORBA interface will hide the INAP or CAP protocol from the external service providers. Instead higher level service features are provided to the external service providers. This open interface is defined to the customised application for mobile network enhanced logic (CAMEL) service environments (CSE), subscriber identity module (SIM) application toolkit (SAT) servers or mobile station execution environments (MEXE) servers. The CAMEL service environment (CES) provides the execution environment within a CAMEL SCP executing a service logic. The proposal has the problem that the signalling between the mobile services switching centre and the CAMEL service environment uses the SS7 standard which is not considered as particularly flexible.

The services that may be used for the call or session can be external i.e. independent services from the telecommunication network used for the communication. The allowable additional services are specified in the associated standards. This means that a network operator may not be able to offer a new service if it is not specified in the standard. The time taken for a new service to be accepted into a standard may be relatively long.

An open service architecture has therefore been proposed in which the service capabilities will be standardised but not the services themselves. The open service architecture allows for externally provided services and effectively provides a translation service which allows the network and the external service providers to interact. The service capabilities will consist of bearers (connections) defined by quality of service parameters as well as the mechanisms needed to provide the services. It has been suggested that open interfaces based on distributed object techniques be used. An example of such open interfaces are those based on the CORBA (common object request broker architecture) standard referred to above. The network protocols are hidden from the service designers. This permits service providers including value added service providers to use the open interfaces for the service design.

The current telecommunications networks may employ a sequence of switches for controlling the routing of a call. Each of the switches may invoke their own controlling service for the call connection. This is a drawback when considering the overall management of the control functions provided by the several services for a communication.

In WO97/07637 a communication system for call handling is described employing a single switch for triggering the call to multiple services. In response to a trigger being detected in a call, service arbitration logic provides a particular service to a subscriber by routing the subscriber to the location in which the logic for performing the service is located. This location may be in a third party service provider. In one of the embodiments shown in this document, three service providers are provided with the middle service provider being connected to the other two. If more than one service responsive to a common trigger point is required, the trigger information is passed to a first third party service provider which passes this information on to the other third party service providers which provide a service in response to the same trigger. Thus the arrangement shown in this document suggest provision of services to a subscriber unit by numerous SCPs. The service arbitration logic is located at a "primary" SCP that passes information relating to a trigger to a "secondary" SCP. However, the information may pass via several such service providers which do not necessarily provide the subscriber with a service in response to the detected trigger, thereby increasing the amount of signalling in the system. In addition, the is no suggestion in the document how to actually detect services and/or proceed with services that provide call control features for a call.

Thus, a problematic situation may occur when more than one independently designed controlling service is requested for a call from a common trigger point, as the controlling features may be in conflict with each other and/or may interact and may thus not be used for a single call. In the prior art proposals the services may be invoked in such an order that only some of the controlling services to which the user has subscribed are in practice available to the user or can be successfully invoked. Multiple controlling services may have a disadvantageous influence to other services, or may even cause a malfunction to the telecommunications system or block the system if used at the same time for a call.

SUMMARY OF THE INVENTION

It is an aim of the embodiments of the present invention to address one or several of the problems of the prior art.

According to one aspect, the present invention provides a telecommunications system for providing a plurality of services, said plurality of services providing control for communication via the telecommunications system, said system comprising: a switching point for triggering one or more services of said plurality of services for a communication, said one or more services reserving at least one control characteristics; and a service manager connected to the switching point, said service manager being arranged to determine if at least two services of said plurality of services can be provided for the communication based on information relating to control characteristics of said at least two services, wherein a new service can be started only if the control characteristics required by said new service are not already reserved by a previously invoked service.

The service manager may be arranged to invoke services providing control for the communication in response to events associated with the communication, said event being received from the switching point. The service manager may also arranged to maintain service specific information of events that are to be reported to the respective service. The service manager may be arranged to invoke only such services for the communication that have control characteristics that are compatible with the control characteristics of one or more services of said plurality of services previously invoked for the communication. The service manager may also be arranged to invoke the services in a predefined order.

The control characteristics of a service depend on control types to be used for the communication by the service. The control types of the service may be determined based on control operations accomplished by the service and/or parameters used in the control operations.

A telecommunications system may also comprise an adapter between at least one of the services and the service manager. The adapter is preferably arranged to determine the control characteristics of said at least one service based on a response from said at least one service.

According to another aspect the present invention provides a service manager for use in a telecommunication system for managing a plurality of services provided by the telecommunication system, said plurality of services providing control for connections via the telecommunications system, the service manager comprising: an interface to a switching point of the telecommunications system for interfacing one or more services of said plurality of services for a connection; an interface to at least two services of said plurality of services; and control means for determining if said at least two services of said plurality of services can be provided for the connection based on information relating to control characteristics reserved by said at least two services, said control means being arranged to enable a new service to be started only if at least one of the control characteristics reserved by said new service is not already reserved by an already invoked service.

According to another aspect the present invention provides a telecommunications system for providing a plurality of services, said plurality of services providing control for communication via the telecommunications system, each service reserving at least one control characteristic, said system comprising: a switching point for triggering one or more services of said plurality of services for communication; a service manager connected to the switching point, said service manager being arranged to determine if at least two services of said plurality of services can be provided for the communication based on information associated with the control characteristics reserved by said at least two services; and selection means for selecting new services from a list of available services, wherein the list of available services is based on information of the control characteristics reserved by the previously selected services.

According to another aspect the present invention provides a method in a telecommunication system for providing a plurality of services, said plurality of services providing control for communications via the telecommunication system, said method comprising: initiating a communication via the telecommunications system; invoking a first service of said plurality of services for the communication by a service manager, said first service reserving at least one control characteristic for providing control for the communication; detecting that a second service of said plurality of services is to be invoked for the communication, said second service reserving at least one control characteristic for providing control for the communication; and determining by the service manager if said first and second services can both be provided for the communication based on information of the control characteristics reserved by said first and second services for controlling the communication, wherein the second service is invoked only if a control characteristic reserved by said second service during the invoking thereof is not already reserved by the first service.

In more detailed embodiments of the invention the first service may provide the service manager with information on the control characteristics the first service reserves for the control of the communication. The second service may provide the service manager with information on the control characteristics the second service reserves for the control of the communication. The service manager may maintain communication instance information before the control of the connection is returned to the switching point, update the communication instance information based on responses received from the invoked services, and pass the updated communication instance information to the switching point after the service manager has contacted the services to be invoked. The service manager may determine the control characteristics based on a message received from a respective service.

BRIEF DESCRIPTION OF DRAWINGS

For a better understanding of the present invention and as to how the same may be carried into effect, reference will now be made by way of example to the accompanying drawings in which:

FIG. 11 illustrates signalling flow for the embodiment of FIG. 9.

DETAILED DESCRIPTION OF EMBODIMENTS OF THE PRESENT INVENTION

Figure 1:
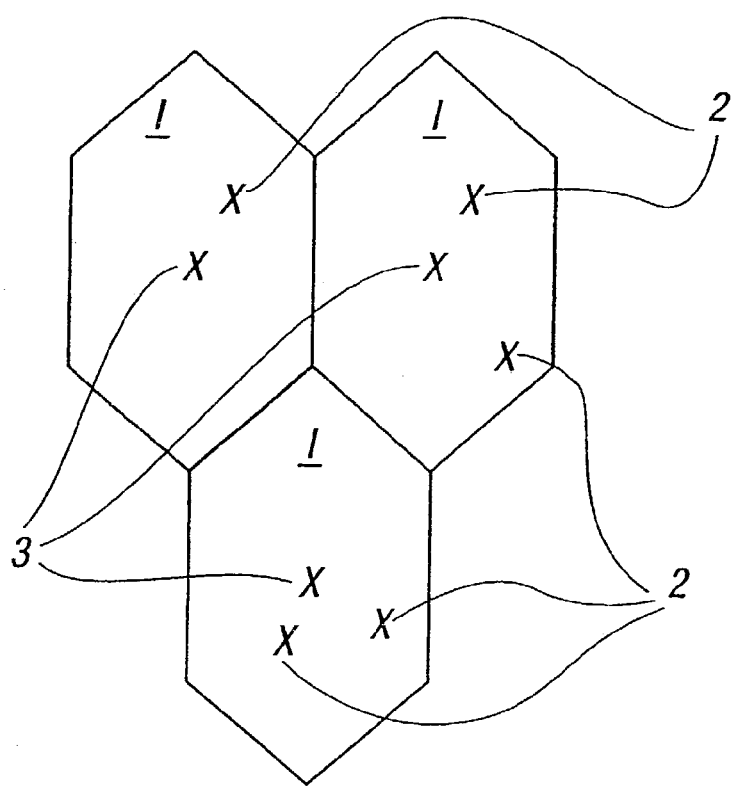
FIG. 1 shows a cellular telecommunications network with which embodiments of the present invention can be used.

Reference will first be made to FIG. 1 which shows a network with which embodiments of the present invention can be used. The network is a wireless cellular telecommunications network three cells of which are shown. Each cell 1 is served by a respective base transceiver station 3. Each base station 3 is arranged to transmit signals to and receive signals from a mobile station 2 in the cell associated with the given base station. Likewise, each mobile station 2 is able to transmit signals to and receive signals from the respective base station.

The cellular telecommunications network shown in FIG. 1 uses the proposed UMTS (universal mobile telecommunications service), but it will be understood that the embodiments are analogously applicable in other cellular and fixed line telecommunications systems.

Figure 2:
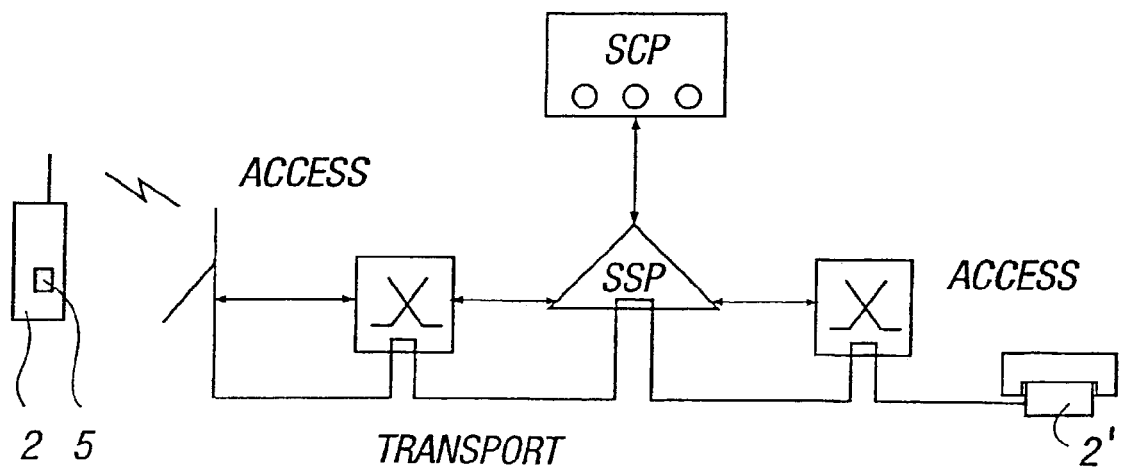
FIG. 2 shows a simplified illustration of the basic functions of an intelligent network service.

Before explaining in more detail the operation of an intelligent network concept for cellular networks, a brief explanation of the basic functionalities of an intelligent network will be given hereinbelow with reference to FIG. 2 describing a simplified structure of an IN concept. The exemplifying call connection is established and carried by means of a telecommunication system between a mobile terminal 2 and a fixed line telephone terminal 2'. The functionalities and elements required for the network access of the terminals and the transportation of the call between the terminals are known, and will thus not be explained in more detail.

In general, the IN architecture can be defined to comprise the following functions: service switching, service control, service management, service creation and resources for handling various tasks. A service switching point (SSP) of FIG. 2 can be used for detecting an IN call and for triggering the call and/or signaling relating to the call to the service control node. It may also receive responses from the service control node. In FIG. 2 the service control node is implemented by a service control point (SCP). The SCP contains the logic and required data for the IN services and may thus be used for executing the service. It is noted that although FIG. 2 shows only one service control point capable of providing more than one service, the system could employ more than one service control point for providing multiple controlling services.

An IN application protocol (INAP) may be used for the interface between the functional entities of the IN, such as the switching node and the control node. The INAP is used, for example, for reporting events, connecting the call to a specified number, user interaction, detection point handling, charging operations and so on. According to the general principles of an IN, the service logic is made independent of the switching and transport functionalities of the network system.

Figure 3:
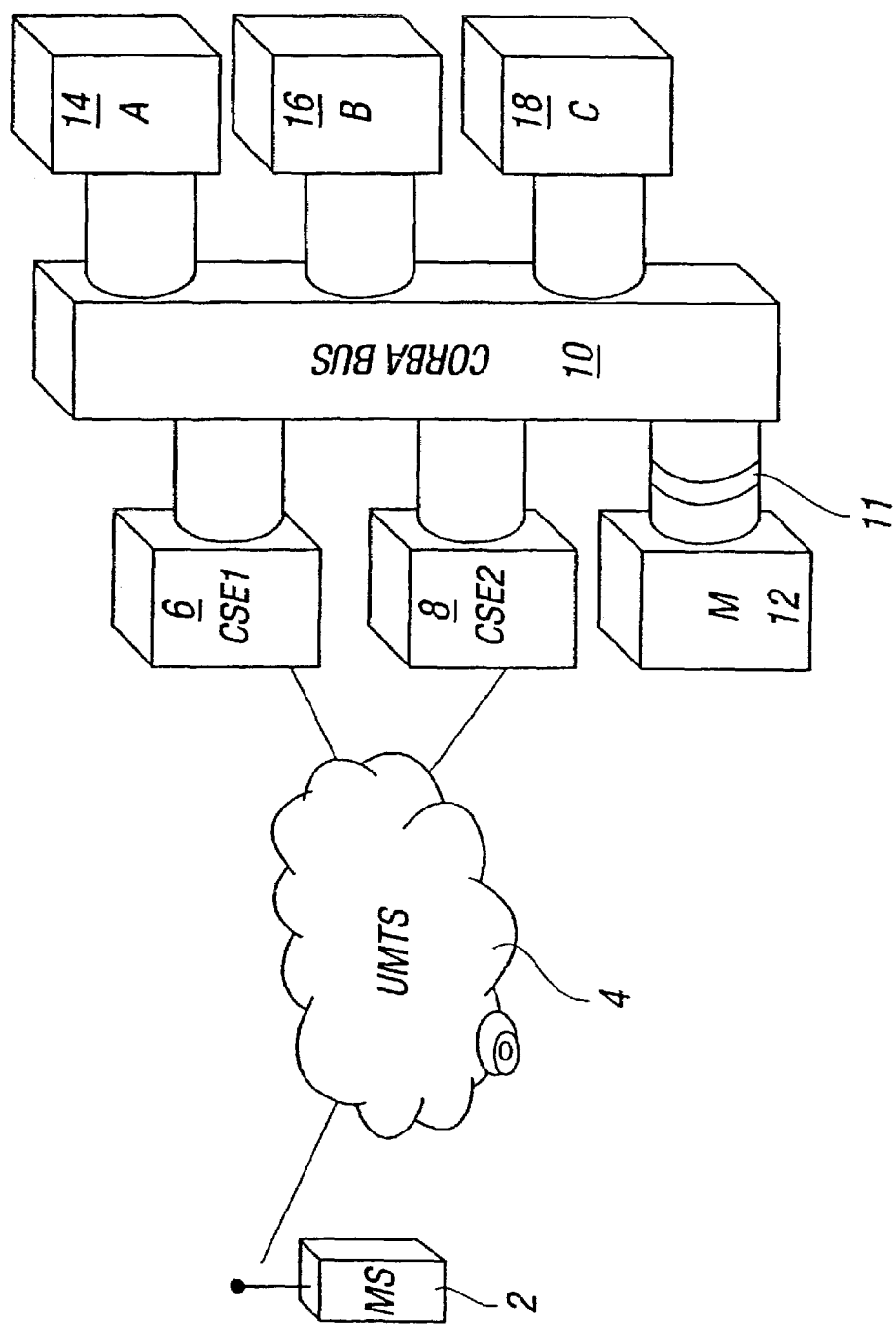
FIG. 3 shows a view of an embodiment of the present invention.

Reference will now be made to FIG. 3 which shows a schematic view of an embodiment of the present invention. The mobile station 2 is shown as being connected to a UMTS network 4. The UMTS network will include the base stations of FIG. 1 as well as other network components required for the operation of the network.

The UMTS network 4 of FIG. 3 is connected to first and second interfaces 6 and 8. These interfaces 6 and 8 may be CAMEL service environment (CSE) interfaces or any interfaces providing similar functionality. The CSE is the execution environment within a CAMEL control functionality, executing the service logic required in some embodiments of the present invention. A CSE interface may be provided for each subscriber between the switching point (e.g. a mobile switching center/service switching point) and the CAMEL SCP (i.e. the SCE). CAMEL stands for customised applications for mobile network enhanced logic and is being proposed as an addition to the current GSM (global system for mobile communications) standard. The CAMEL feature is designed to allow operator services which are not included in the standard GSM services. In particular, CAMEL aims to provide a mobile station with non GSM standard services, regardless of whether the mobile station is in its home network or is roaming in a visited network. The CAMEL service environments have a CORBA interface. This interface is with service providers. This allows the service providers to interface with the CSE interfaces 6 and 8 via the CORBA interface. Via the CSE interfaces 6 and 8 inter operability between the service providers and the network can be obtained. This will be described in more detail hereinafter.

The interfaces 6 and 8 are connected to a bus 10. In the specific embodiment of the present invention disclosed by FIG. 3 the bus is in accordance with the CORBA standard. However, other appropriate standards may also be used for bus 10. The CORBA standard is object oriented and is on top of the TCP/IP protocols of the SS7 protocol suite.

Also connected to the bus 10 are three service providers 14 to 18 respectively. The service providers may be value added service providers (VASP). The service providers may be the network operator or a third party, for example an independent external service provider or another operator. The service logic required to provide the given services is executed in the service providers 14–18. Thus, each of the service providers shown in FIG. 3 comprises a service logic program (SLP) for each service provided thereby. In the IN architecture the service providers are sometimes referred to as service control points (SCP: see FIG. 2).

Finally, a service manager 12 is connected to the bus 10. The service manager 12 is preferably controlled by the operator of the network and in turn controls the interfaces 6 and 8. The manager 12 is connected to the network 4 via the bus 10 and the interfaces 6 and 8. FIG. 3 discloses also an adapter 11, the function of which will be discussed later in the context of a further embodiment of the present invention shown by FIG. 9.

The interface to the external services may be based on distributed object oriented technology. In this the subscriber refers to an object using a logical name of the object and issues an invocation to an object request broker. The object request broker routes the request to the desired object, e.g. to a server. The subscriber does not need to have any knowledge of the actual location of the object whenever an unambiguous logical name of the object is known.

Figure 4:
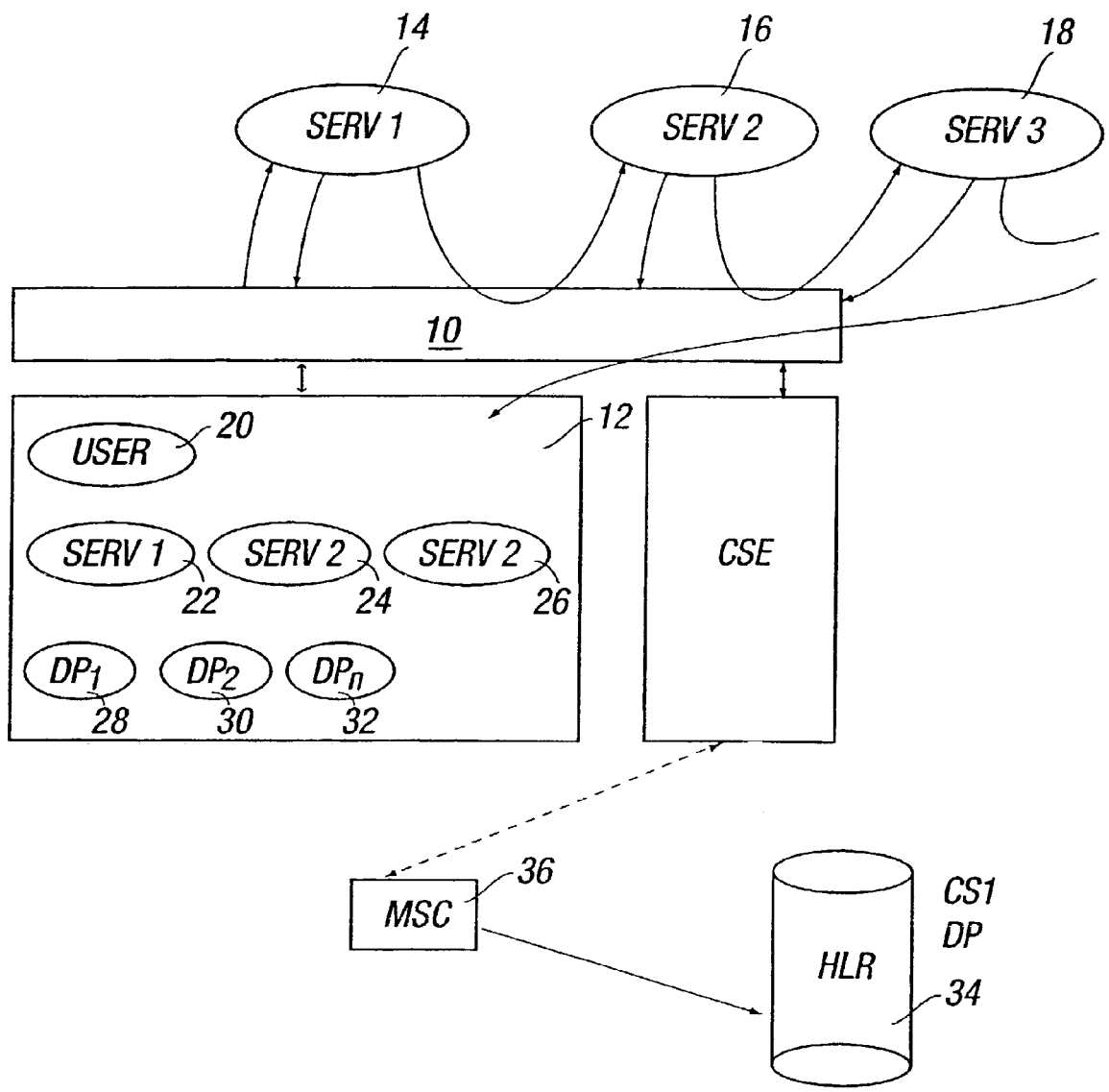
FIG. 4 shows the service manager of FIG. 3 in more detail along with the service providers.

Reference is now made to FIG. 4 which shows the service manager 12 of FIG. 3 in more detail.

When a new service is provided by an existing service provider 14–18 or a new service provider, the manager 12 will store information in a register about this service. The manager 12 also stores information about the events which are required to occur before the associated service is triggered.

When a new service is subscribed to or made available to a given mobile station, the manager 12 is advised. The manager 12 obtains the service profile of the user from the home location register 34 of the network 4. This will be via the appropriate CSE interface 6 and 8 which allows a connection to the network 4. The information stored in the home location register 34 will be obtained via the mobile service switching centre MSC 36 which is also part of the network 4.

The service profile is illustrated schematically in FIG. 4. The manager 12 then checks for the user 20 the services 22, 24 and 26 which are currently subscribed to by the mobile station and modifies the service profile of the mobile station to also take into account the new service. In other words, the new service is added to the profile. The manager 12 may check the services which are provided to the mobile station or may alternatively check the service providers used by the mobile station. In the latter case, the manager 12 may not know the individual services to which the mobile station subscribes.

If the new service makes use of the CAMEL feature, the service manager 12 creates CAMEL subscriber information CSI and associated detection point information. CSI information comprises the address of the associated CSE unit, the detection points, criteria for service order determination and the basic service information such a telephone, facsimile or data connection. The detection points are those which should be detected in order to support all the services to which the mobile station subscribes. The detection points 28–32 correspond to the events stored in the manager 12 which are associated with a given service. As shown in FIG. 4, the mobile station subscribes to n services. For illustrative purposes, the detection points associated with the first service only are shown and m detection points are required for each service. The manager 12 already has the detection points associated with the other services 24–26 to which the mobile station subscribes.

The modified subscriber data may then be stored in an appropriate location in the network. According to a preferred embodiment the subscriber data is stored in the home location register HLR 34 of the network 4. Other possibilities are, for example, a visitor location register (VLR: see FIG. 6), the service manager itself, an independent database node for storing subscriber data, and the MSC.

When the mobile station attaches itself to the network, the manager 12 is notified by the network 4 via the interface 6 or 8. The manager 12 obtains the service profile of the mobile station from the home location register 34 via the interface 6 or 8.

Figure 8:
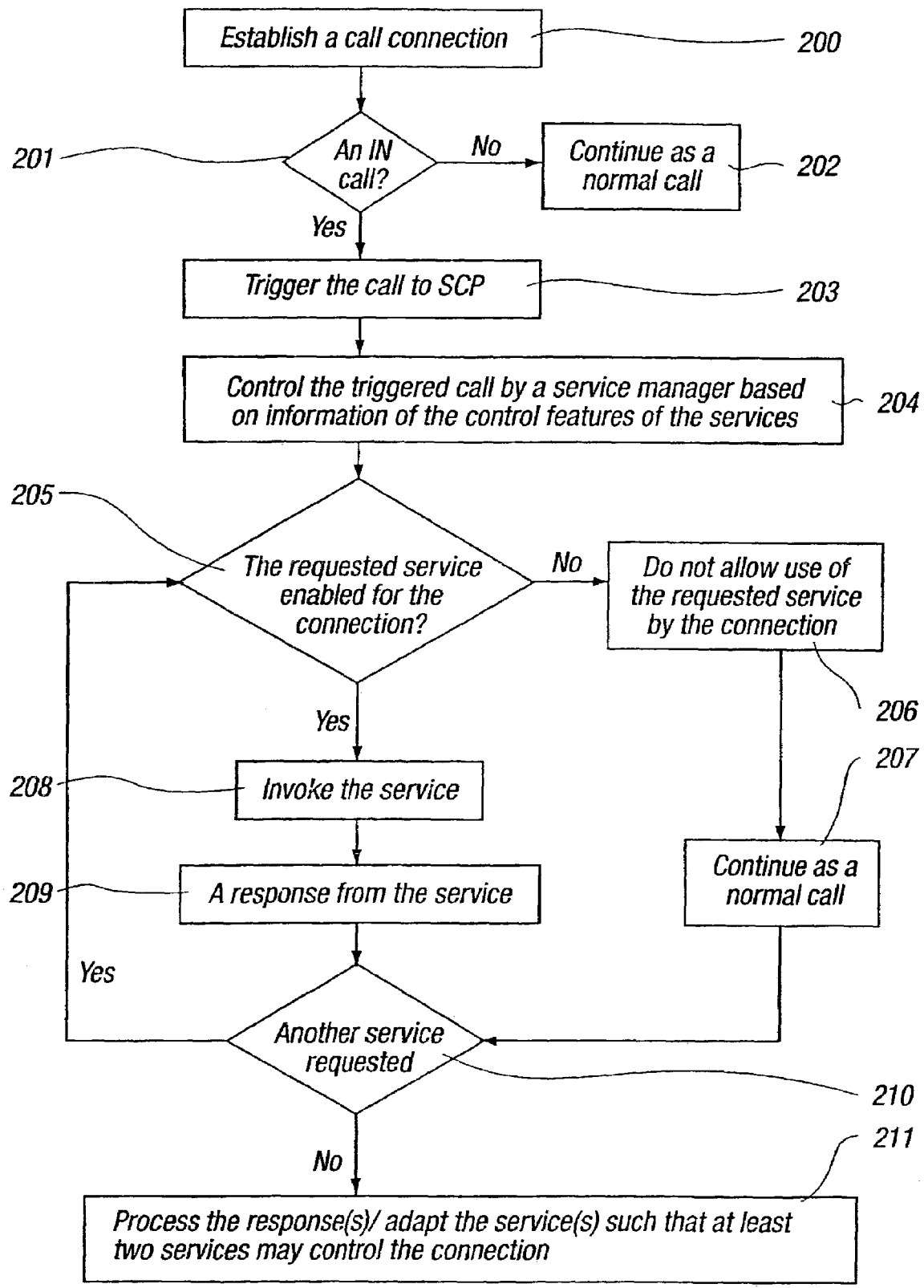
FIG. 8 is a flow chart for one embodiment of the invention.

Operation in accordance with one embodiment of the invention will be described with reference to a flow chart of FIG. 8. A communication in a form of a telephone call is established between a subscriber and a network node, such as a mobile switching centre (MSC), at step 200. The switching node detects at step 201 that the call is to be switched to a intelligent network service (IN), and subsequently triggers at step 203 the communication to at least one service of plurality of services provided by a service control functionality (SCP) in accordance with the intelligent network architecture. In case the call does not request any IN services, the call communication will be established in a normal manner as designated by step 202.

The call connection triggered to the SCP (service provider) implemented in the IN may be controlled by a service manager. The control may be based on characteristics specific for the requested services and/or a service profile specific for the subscriber. It is noted that herein that the term "subscriber" means either the terminal subscribing to the network (e.g. the mobile station 2 or the fixed line terminal 2' of FIG. 2) or the user of the terminal. In other words, a specific service profile may be defined to a specific terminal or group of terminals or alternatively or additionally to a user or group of users. In the first instance the specific service profile is designated to a terminal and will be used whenever the terminal is involved in a call. In the latter case the subscriber may use any terminal. After an appropriate recognition of the subscriber (e.g. a personal PIN code or some other identification) the subscriber will receive a similar service from the telecommunications system regardless of the terminal he/she may use. The creation and possible parameters of the subscriber specific profile will be discussed later in this specification. The service manager 12 may invoke only such services of the plurality of services that are enabled to said subscriber while the service manager will not allow any such services that are not enabled, as shown by step 205.

At steps 205 to 209 the service manager invokes a first service of the plurality of services, and subsequently receives, as a response, information relating to the first service from the first service. Thereafter the service manager may invoke a second service of the plurality of services, and receive correspondingly, as a response, information associated with said second service from said second service. The information contains specific control characteristics of the respective controlling services, the use whereof which will be described below. If requested, the service manager may also invoke a third service, a fourth service, a fifth service and so on, depending on the total number of the services requested by the subscriber. After the service manager has received the responses from all of the invoked services, the service manager processes at step 211 the information to provide information which can be used to provide a combined control of the connection. The information is subsequently provided to a network element controlling the call connection, such as the triggering point.

In case the requested service is not enabled to the subscriber, the call is continued as before without initiating the service and providing any control by the requested service for the call, as shown by steps 206 and 207. The subscriber may be provided with an announcement of this, such as with a text message "service X not possible". According to one possibility, if the services would conflict is a disadvantageous and uncontrollable manner, a fault message may given and the call is disconnected (i.e. the communication is cleared).

In more particular embodiments, the error message may comprises an unstructured message from a content server, such as an Internet content server. The message may also be a wireless application part (WAP) push message from a content server, such as a WML (Wireless Mark-up Language) message.

According to one alternative the message is an arbitrary content push message from a content server. The push messages are in general messages or documents that are not retrieved or requested by the user but that are simply "forced" i.e. pushed in the user equipment. It is also possible that the service manager constructs a text, picture or voice message to the user of the communication based on the current service environment. In other words, in a conflicting situation it is possible to conclude from the service environment the required error message. The message is preferably in a format that is readily understandable by the user. The message may inform the user the status of the services, e.g. that the requested service cannot be used with prepaid call services or a simple description of the conflict situation (e.g. "service B cannot be used for the call while service A in use" or "hold is not allowed for premium rate calls" or "to continue your call, select service profile B"). The current service environment may comprise the services already invoked for the communication. The current service environment may also comprise a service that was not enabled for the communication. According to one possibility the current service environment comprises the service profile that has been selected for the communication.

The error message may also indicate the action or actions without which the service can be enabled for the communication. After having received the error message the user may then choose one or several actions that are to be excluded from the requested service, and thereafter the new service will be invoked without provision of these features. The message may also indicate the conditions in which the service that was not enabled in the first place can still be enabled for the communication. For example, a user calling with a business service profile may be instructed to select private service profile before the new service is enabled.

In addition to the general control of allowing services for the user, the service manager may adapt at step 211 the invoked services based on the control characteristics and/or the service profile. The adaptation procedure is such that the subscriber is able to use simultaneously at least two different services of the plurality of services for the call connection. Examples of possible adaptation procedures will be discussed later.

According to one embodiment, when the manager 12 has information on all of the services to which a terminal, such as the mobile station 2, subscribes and which are triggered to be used for the connection, the manager 12 analyses the control characteristics of the services to ascertain whether there are any services which have a common control characteristics and/or control characteristics which may not be used for the same connection. The service manager 12 then makes a decision as to whether to allow all of the requested controlling services or whether some of the requested controlling services should not be allowed or should be allowed only in a modified form.

The service manager may also make a decision concerning the order in which the services having the same trigger point are to be invoked. The decision made by the manager may use any suitable criteria. For example, the decision may be based on one or more of the following criteria: service priority; subscriber priority; time of the day, week or month and so on; and service type (e.g. data, video or speech). The manager 12 may thus also store for each service information relating to the criteria used by the manager 12 to decide the order in which the services having the same trigger point or condition for triggering are to be invoked.

When the analysis has been completed, the manager 12 may inform the interface responsible for the given detection point the order of the services which must be invoked when the event in question has been generated by the subscriber terminal. This analysis may be carried out e.g. each time a mobile station attaches to the network or may be carried out each time the mobile station changes the services to which he subscribes either by subscribing to a new service or removing one of the services to which he subscribes. In the latter case, the results of the analysis are stored in a suitable location. The analysis may also be carried out during an ongoing connection should a predefined event triggering this occur. As discussed above, the storage location may be in the manager or, if the network is provided with a home location register (HLR) functionality, in the HLR. The storage location may also be distributed between various element of the telecommunications system. If the order in which the services are invoked stored in the manager, it may store the order in the CAMEL subscribers information (CSI) detection point information.

When the mobile station is attached to the network and a given detection point is triggered, the exemplifying service providers providing services associated with the detection point which has been detected are advised by the CSE interfaces. For example, in the embodiment shown in FIG. 4, the first service provider 14 is first advised of the detection point in question being triggered. This will be via the bus 10. The service associated with the first service provider 14 will therefore be invoked first. The second service provider 16 which provides a service in response to the detection point being triggered is advised by the first service provider 14 that the detection point has been triggered. This is again done via the bus. The second service provider 16 will then invoke the service associated with the given detection point. The second service provider 16 will then send the information on the detection of the triggering of the detection point to the next service provider 18.

It should be appreciated that in some embodiments of the present invention, the information that a given detection point has been triggered is sent only to the service providers which provide services to the subscriber in question in response to the detection of the detection point. Additionally, the order in which the service providers receives the information about the triggering of the detection point may depend on the order in which the services are to be invoked. This order is that determined by the manager 12. In some embodiments of the invention, the service providers may be advised of the triggering of a relevant detection point in a predetermined order. The order of the triggering of the services may be based e.g. on a register containing information associated with the possible services, the register of the service profile of the subscriber or some other appropriate register defining parameters which may be used for this.

When all of the service providers which need to be notified have received the information on the triggering of the detection point, the last service provider sends a confirmation back to the service manager 12 via the bus 10. It is noted that the bus can be any suitable bus and need not be a CORBA bus.

A similar procedure may be used when a mobile station no longer subscribes to a given service. In particular, the manager 12 obtains the mobile station's user profile and removes the service which the subscriber no longer wants. This will involve removing information on the service and the associated detection points. The manager may also analyse again all the services which are provided to see if more than one service is activated in response to a given trigger. As before, the manager will determine the order in which services which are responsive to a common trigger point are to be invoked. The order in which services are invoked may change if a given service is no longer to be provided. The revised subscriber profile will be sent back to the storage location, such as to the home location register.

The order in which the external services are reported of the events which originate from the MSC may proceed in the following manner. The external services that are invoked are arranged in a chain in accordance with a predefined order. The events reported from the MSC are reported to each of the services in the chain in accordance with the order of the services in the chain. The events originating from the called party are reported firstly to the last service in the chain. These events originating from the called party side may be events such as a call set-up request response message, mid-call feature invocation (e.g. "hook flash"), call release message from the called party direction, routing failure in a forward (called party) direction and so on. From the above the mid-call feature is for example a unstructured supplementary service data (USSD) message or a dial tone detected by a switch. The events originating from the calling party are reported firstly to the first service in the chain. These event may be events such as busy, answer, called party release and so on. Call instance information can be modified by each service in the chain and the modified information is subsequently passed via the service manager to the following i.e. next service in the chain to receive the event. An example of the operation of the chain is when the first service translates the called party number from an abbreviated extension number to a personal number of the called party, the next service translates the personal number of the called party into a number in which the called party is currently registered (call forwarding). In this example the modified data comprises the modified number transferred from the first service to the next service.

The above facilitates the multiple services to influence the call in a controlled manner. The services become aware of the effects of possible other services to the call in a predefined order. The described reporting algorithm may be emulated within a single switch and a single CSE.

Figure 5A:
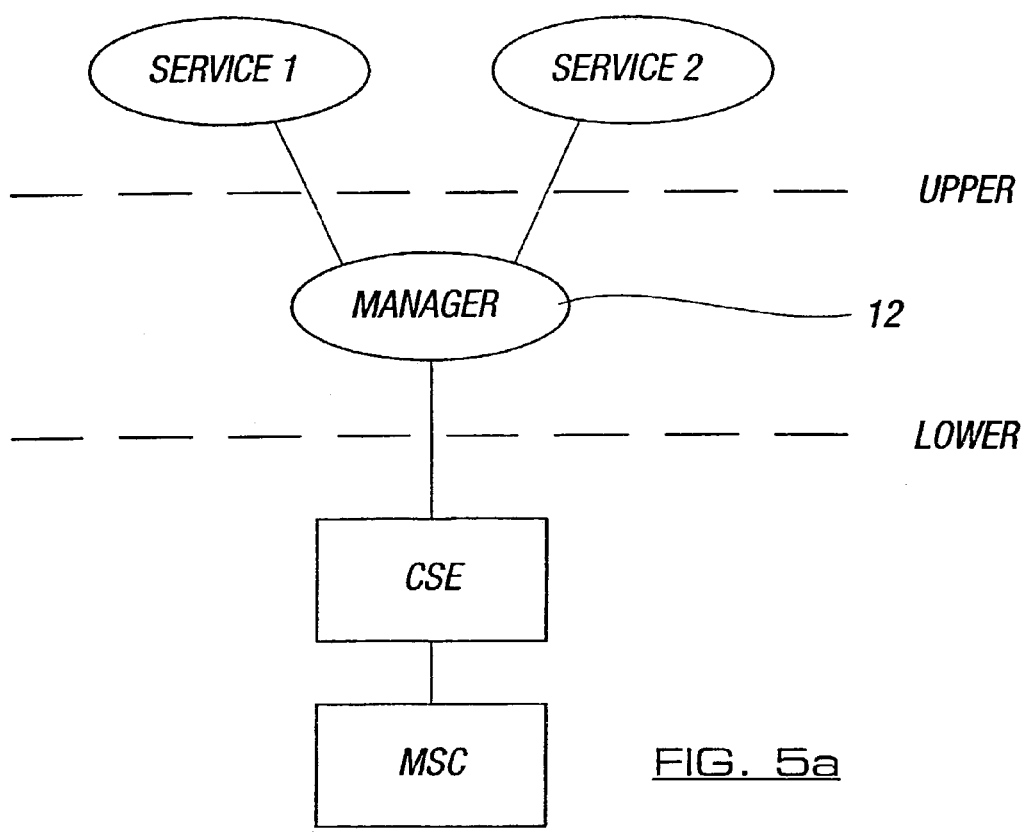
FIGS. 5a and 5b show two different interfaces between the services.
Figure 5B:
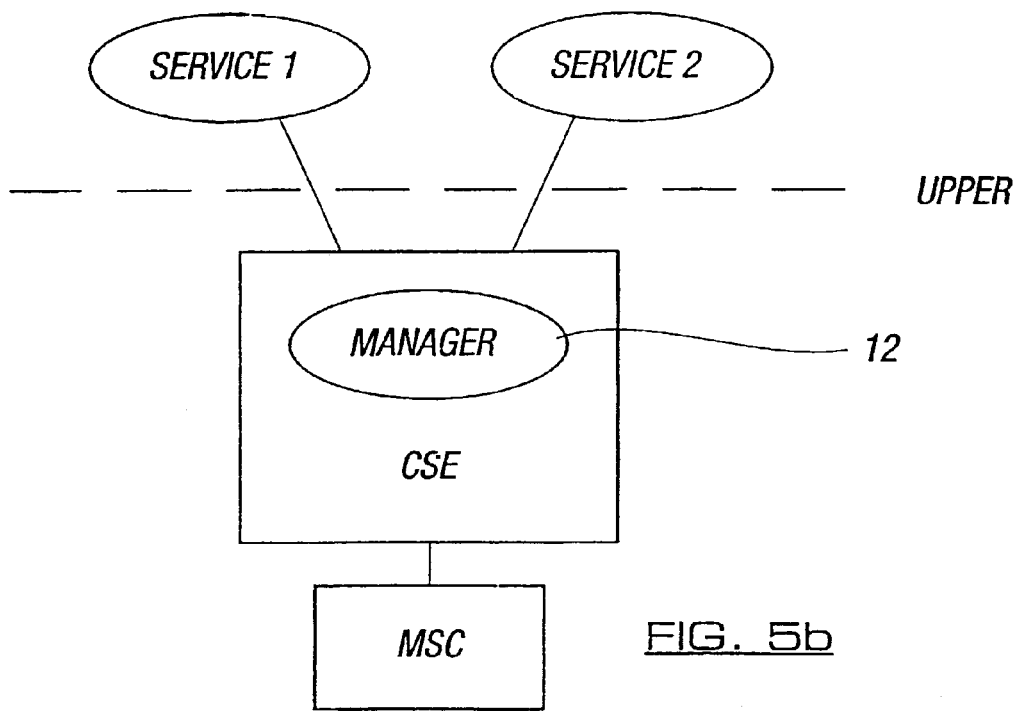

FIGS. 5*a* and 5*b* show two possible ways of implementing interface between the service manager 12 and the controlling services. The interface may provide e.g. a CAP—CORBA translation between the services. FIG. 5*a* discloses an arrangement in which the service manager is placed on top of an open single service interface (the "lower" interface: e.g. a simple CAP operation). The upper interface provides a multi-service open interface towards the multiple services. In other words, the service manager provides the upper interface for the external services providing the above discussed functionalities. In FIG. 5*b* the service manger is placed directly on top of a CAP interface and within the CSE functionality.

The independent external services have been designed independently from each other towards one common interface, such as the upper interface of FIGS. 5*a* and 5*b* and may have various different characteristics. In embodiments of the invention, it is not necessary to consider the other services and the control characteristics thereof when designing new services. After a new service has been implemented, the control characteristics of the service, such as the control types of the service, are defined and the services are invoked based on the information of the control characteristics. For example, the services to be invoked by the service manager may reserve certain control types for their use. When a service reserves a control type, the other services may not use the reserved control type.

The definition "control types" can be said to mean classification of the control functions of the service. For example, the purpose of the control types may be to clarify which services may interact and which services may be combined i.e. used simultaneously to control a call from one signalling point. Two services which require the same control type cannot control simultaneously the call. The control type can be determined based on the operations in the interface between the service and the service manager or the parameters thereof. The control types may also be based on an agreement between the services. To give an example of the determination of the control types, the control types may be determined e.g. by mapping from different operations types (e.g. connect) and parameters (e.g. called party number) provided in the operation types. For example, 'connect a called party number 5551234' maps to control type: 'call routing control'. The call routing control is one possible control type, the call routing control providing an authority to modify routing information for the call. Examples of the other control types include, without limiting to these, charging tariff control (e.g. setting a price for the connection), call duration control (e.g. setting a limitation for the duration of the connection), handling of the parties of the call, re-routing of the connection, management of switching of the connection (such as putting the call into hold, alteration, switching to another connection, switching to a conference call), changing the subscriber information, transfer of the connection, and similar control features. For example, a virtual private network VPN could use the following from the above control types: change of the subscriber information (changing the B subscriber number to a long number format recognisable by the network) and setting the price for the connection (for example, subscribers belonging to the virtual private network may have a lower fee for the calls than the other subscribers). The control types may be defined by the services, by the service manager or by a control functionality of the telecommunications system.

The information of the control characteristics of the services can be utilised either before invoking the services or after the services have been invoked. When the control type information is used before invoking a service it is necessary to define whether the new service will fit in to the subscriber's service profile or not before the service can be added thereto. In addition, when a new service is to be added to the service profile it is necessary to study whether it will have an influence on the outgoing, incoming and transferred calls. For example, if the service influences the outgoing calls, it is necessary to define whether there are any other services in the subscriber's service profile which may have influence over the outgoing calls. If the profile already includes services having influence on the outgoing calls, then it is necessary to define whether these services require same functions from the control types as the new service to be added. If so, it is not possible to add the service. It is possible to have two services for controlling the same call from the same point (terminal or network element), but in such an event it may be necessary to prioritise the services. In addition, the operation order of the previous services has to be known before the new service is added. This may be required, for example, when more than one number transformation of the called subscriber number is performed.

A possibility of utilising the control types before a new service is added to the service profile of the subscriber will be discussed next. A service can be added to the service profile of the subscriber either by the subscriber, the operator or an external service provider. The subscriber may be provided with for example WAP (Wireless Application Protocol) based user interface for adding new services to the service profile. In such an arrangement the new service to be added can be selected from a menu displayed for the user by the user terminal. If the services are added by the subscriber, the list of the available services presented to the subscriber is restricted in accordance with the services the subscriber already has in the service profile. The restriction may be based on the control types reserved by the existing services and the control types required by the new service. For example, if the subscriber already has a service defining the fee for outgoing calls, it is not possible to add a new service for the same to the service profile.

The list in the menu for adding services to the service profile may be arranged such that the services are arranged into various service categories. The selection of the services into the profile may occur by selecting only one out of each category. The previously selected categories may exclude some further categories and/or some separate services.

It is also possible to examine the life cycle of the service in relation to the call state model. That is, a service may reserve control types only for a certain portion of the service state model. For example, a control type may be reserved only during the duration of a call initialisation procedures or for hang-up procedures.

Figure 9:
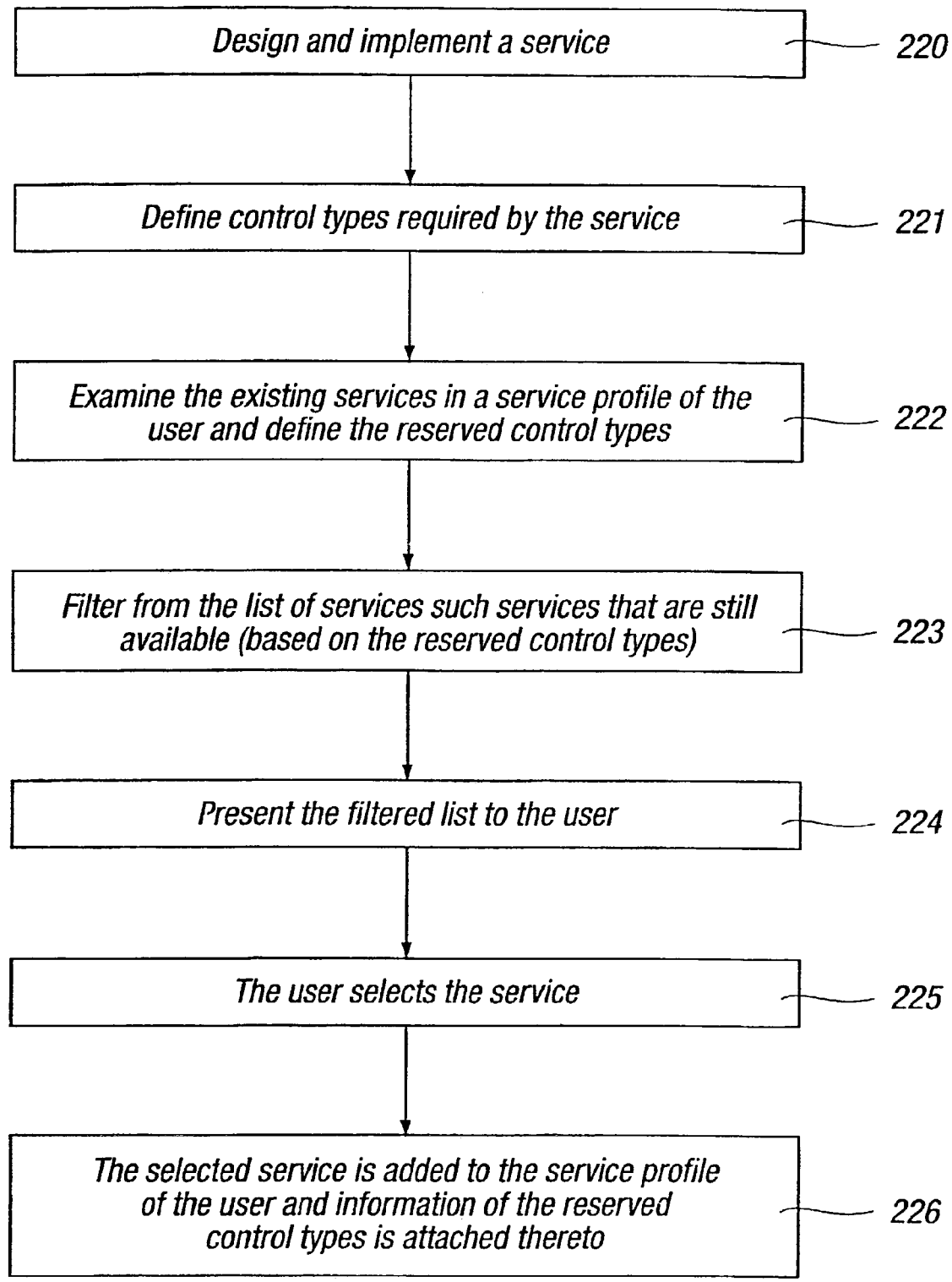
FIGS. 9 and 10 show flowcharts for more specific examples.

The independent services may be added to the service profile of the subscriber in accordance with steps as shown by FIG. 9. The services are designed and implemented at the service control point at step 220. The control types required by the services are then defined at step 221. In the next step 222 all services in the service profile of the user are examined. The reserved control types for the given user are also defined. Services which the user could order are "filtered" based on the information of the reserved control types at step 223 such that a list of still available services can be generated. The list of the available services is presented to the user at step 224. Thereafter the user may select a new service at step 225, and the selected service is added to the service profile of the user at step 226. Information on the reserved control types is associated with the service, and can thus be used later on for the given user.

The following will discuss possible uses of the control types after a new service has been added to the service profile of the subscriber. After the service has been initiated for a call the service informs in its response to the service manager the control types that have been reserved for the call from the given signalling point. The service may be seen to be initiated when the call has been triggered from the switching functionality to the manager, the service profile has been retrieved by the manager and the service has been started by an external server. Since the services have been designed independently from the other services, it is necessary to arrange a service dependent adapter between the service and the service manager. FIG. 3 illustrates an adapter 11 for implementing the adapter functionality. The arrangement is preferably such that the service dependent adapter knows the control types required by the service and informs the service manager of the control types when the service responds to the manager. The adapter may also be arranged to conclude the required control types based on the response or responses given by the service.

The concluding procedure may be service dependant, i.e. specific for each different service. For example, if a call advertising service gives a time limit for the call, it can be concluded that the call advertising service wishes to play an advertisement during the call whenever the predefined call time limit is reached. It can also be concluded that the call cannot be put on hold before the advertising announcement have been played and that a control type "switching" is reserved.

Some of the services may have been designed to interact with the other services and thus they are capable of negotiating the control types they require for operation. Therefore these service may be capable of adapting themselves in a situation in which they cannot receive the all control types they require for the call. Services may also release some or all of the control types reserved for them as the call is switched off. The adapter may conclude the release of control types when the call ends.

Figure 10:
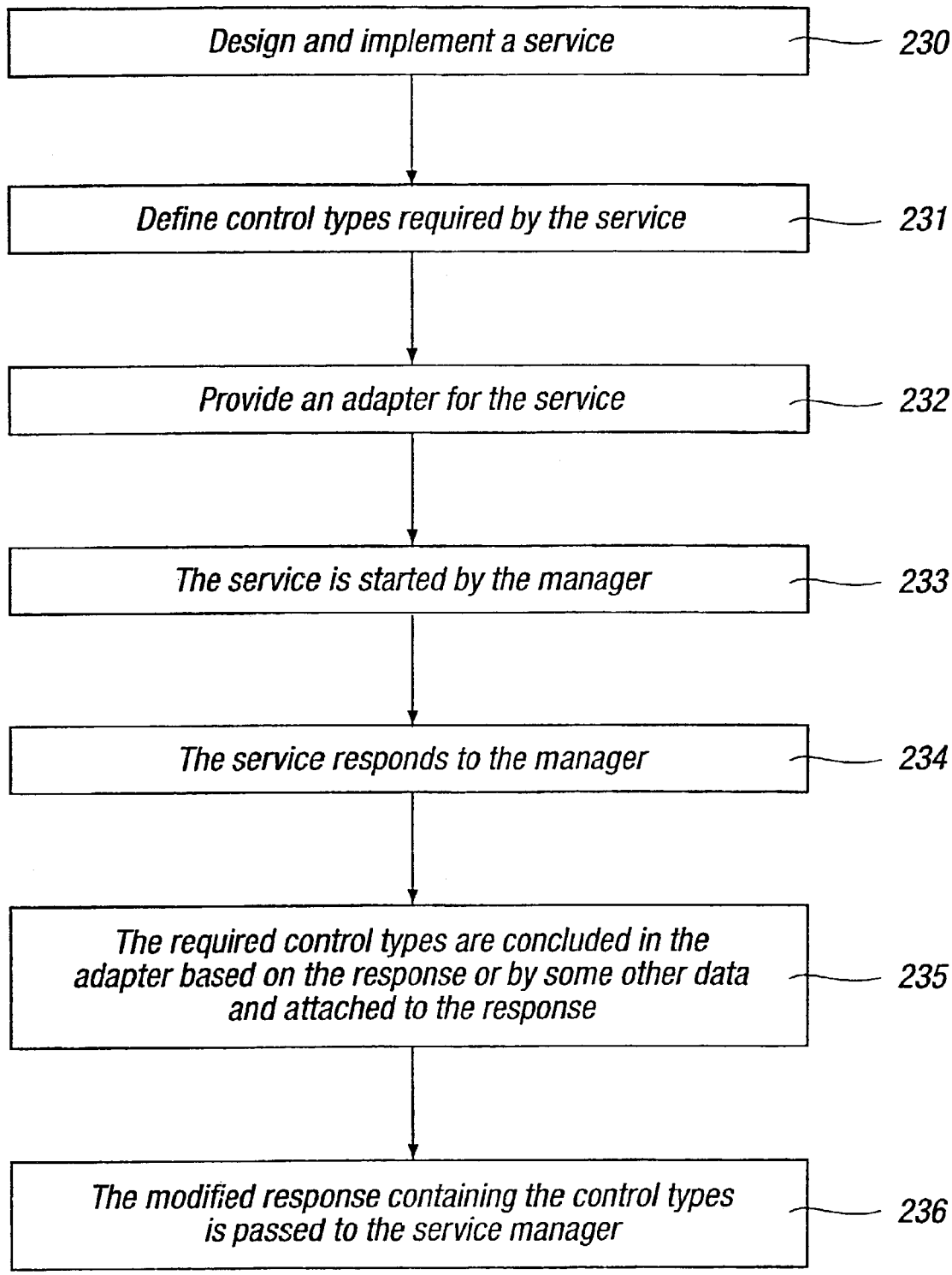

FIG. 10 illustrates a flow chart for the above. A service implementing at least one control functionality for a connection is designed and implemented independently at step 230. The control types required by the controlling service are defined at step 231. An adapter for the service is provided such that the adapter is positioned on the interface between the service and the service manager. The use of the service is initiated at step 223 by the manager which invokes the services in response to a request initiated by the subscriber. At step 234 the service responds to the manager by giving its permission to continue to call control without the service control. The adapter concludes at step 235 the control types required by the service based on the response. The conclusion may also be based on some predefined parameters for the conclusion. The predefined parameters may be stored in the adapter functionality. The parameters may define a fixed set of control classes defined by the given service. The classes may be reserved irrespective of the response from the service. There may also be classes that are either reserved or not reserved depending the response message from the service. The adapter attaches the control types to the response and forwards the response to the service manager at step 236.

The use of the control types when invoking the services gives an advantage in that the services may be somewhat more loosely defined in the service profile than if the control types were not used. This is based on the realisation that all control types for each service are not necessarily always required for each call.

It is possible to implement the service specific adapter to the manager. The adapter may be service specific information of the control types which are reserved whenever a further service is initiated. This information of the reserved control types is accumulated during the invoking of the services, whereby each of the subsequent services may reserve for itself a part of the remaining control types. Correspondingly, it is possible in some instances to utilise the control type information during the adding of the services and also during the invoking of the services such that for a part of the services the control types have been reserved fixedly beforehand during the adding procedure and for a part of the services the control types can be adjusted during the invoking procedure, as described above.

The above procedures which deal with the addition of new services and the removal of old services may be used with services that are temporarily available or temporarily unavailable. These procedures can also be used when a user first subscribes to a network as well as for the existing subscribers. These procedures are again used where the service provider alters the required detection points for a given service or the like. The procedures may be performed e.g. when a subscriber or service provider makes an activation, deactivation or registration request.

The reporting of the events to the external services in the chain, as discussed above, emulates a scenario in which a call has been routed via several switching points (i.e. several MSCs), each of which invokes its own service in the CSE. Each of the invoked external services observes an interface similar to the switching point—CSE interface. This enables the independent design of the external services, assuming that each of the services is the only service controlling the call. The service interaction constrains functions the subsequent service is allowed to determine.

It is also possible to implement embodiment of the invention in other environments than the CSE, such as in a mobile station execution environment (MEXE) or subscriber identity module (SIM) application toolkit (SAT) environment. The SAT provides service execution within a SIM card of a mobile station (=proactive SIM). The MEXE environment can be defined as an environment enabling various features to be executed in the mobile station. These features include an execution of a Java™/WAP service Logic inside the mobile equipment (ME) (designated by reference numeral 5 in FIG. 2), application programming interface (API) to request the ME to perform a task or functionality (e.g. to set up call, to control a call, to send short message service (SMS) messages or to control user interface e.g. via Abstract Window Toolkit™). The service logic can be informed via the API of events associated with the results of a call set-up or incoming calls. The Java™ service Logic can be downloaded into the MEXE from a data network, such as from the Internet. The service logic may also be programmed to be responsive to call related events. The service logic may also report the events to the network.

According to an embodiment a MEXE (or a SAT) environment is in communication with a MEXE server (or a SAT server) provided in the network. The MEXE (or SAT) server provides the open interface functionality in a manner similar to the CSE side manager entity. The MEXE (or SAT) environment provide call or session related events to the server. The arrangement is such that the MEXE (or SAT) environment may temporarily freeze call or session handling while it is waiting for a response from the server, and more precisely, from the external service behind the server. By means of this it is possible to provide a IN type of call state model from the MEXE or SAT on the mobile station side, whereby IN type control of the mobile station is enabled. The control messages from the server or plurality of servers may be translated into application programming interface (API) messages in the mobile station. The messaging between the server and the APIs providing the open interface can be implemented with a service logic executed in the MEXE or SAT environment.

It should be appreciated that in embodiments of the present invention, one or more events or detection points may be associated with a given service.

Figure 6:
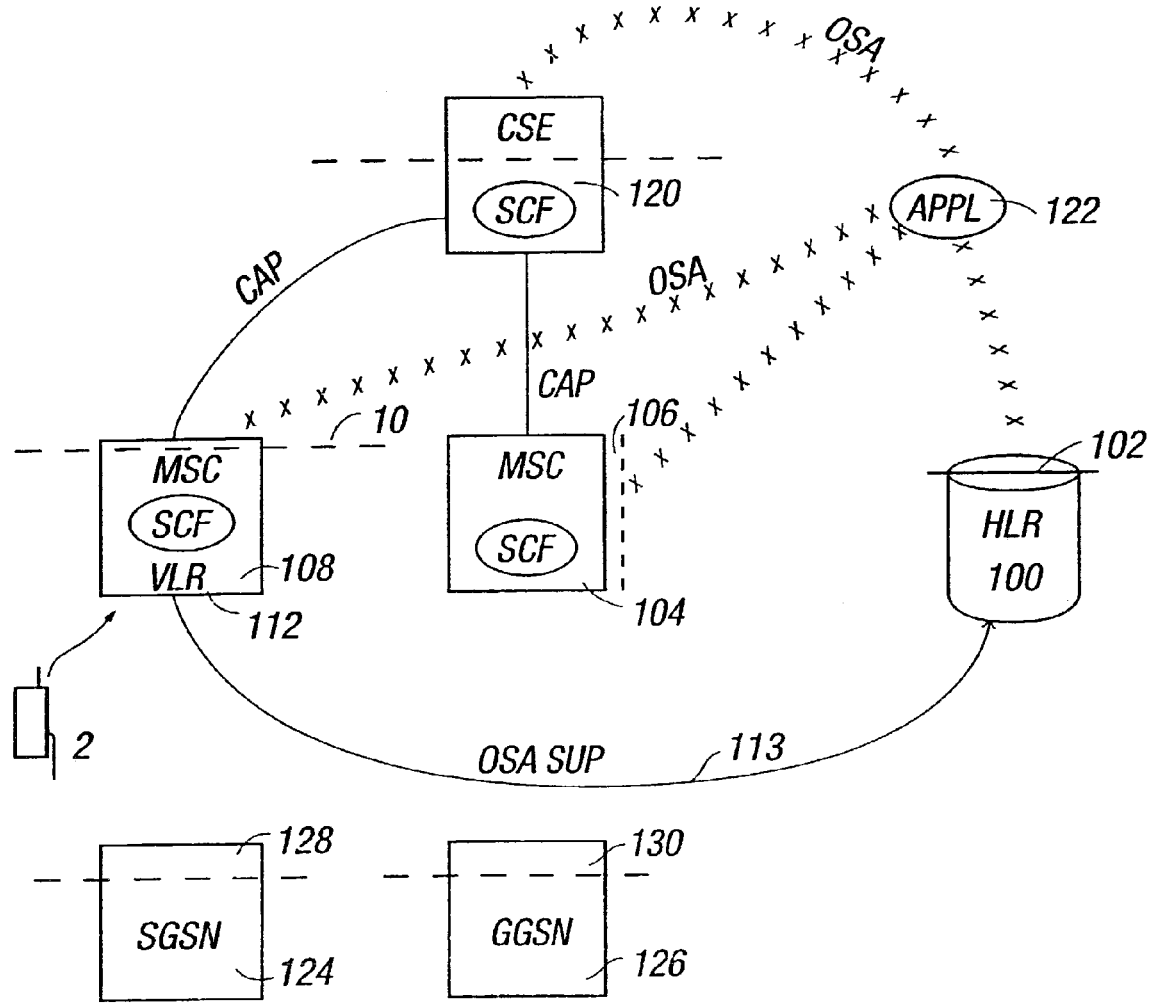
FIG. 6 shows a modification to the network of FIG. 4.

FIG. 6 shows a further embodiment in which the open CORBA interface is introduced directly to the mobile services switching centre and the home location register. This means that the external service providers can obtain subscriber information from the home location register. Additionally the external service providers are able to manage the subscriber information. For example, the external service providers would be able to modify the subscriber information stored in the HLR.

The open CORBA interface can be utilised so that in the subscriber data, CSI data can be stored. Previously, the SS7 service control point address information would have been stored. The triggering to the mobile services switching centre is done in the case that the CSI is not a SS7 address. The mobile services switching centre will resolve the CORBA service name.

In the arrangement of FIG. 6, a home location register 100 is provided. The home location register 100 has an open interface 102. The home location register 100 stores: CSI information as in the first embodiment along with detection point information and the address of the associated CSE unit. The CSI information may contain the application address which provides a service and the internal open service interface to be used.

A first mobile services switching centre 104 is provided with an open services interface 106. A second mobile services switching centre 108 is also provided with an open services interface 110. The second mobile services switching centre 108 is shown as having the visitor location register 112 functionality therein. Each mobile services switching centre has service control functionality SCF, which may be implemented by means of a SCP as described above. A connection 113 is shown between the home location register and the visitor location register which supports the open service interface.

The embodiment of FIG. 6 also shows a CSE 120 again with the SCF functionality. An application or service provider 122 is provided which can be within or external to the network. An open service architecture OSA is provided between each of the following elements:

the HLR 100 and the application 122;
the application 122 and the first mobile services switching centre 104;
the application 122 and the CSE 120;
the application and the second mobile services switching centre 108.

The connection-between the first and second mobile services switching centres may be in accordance with the CAP protocol which is part of the SS7 standard.

Figure 7:
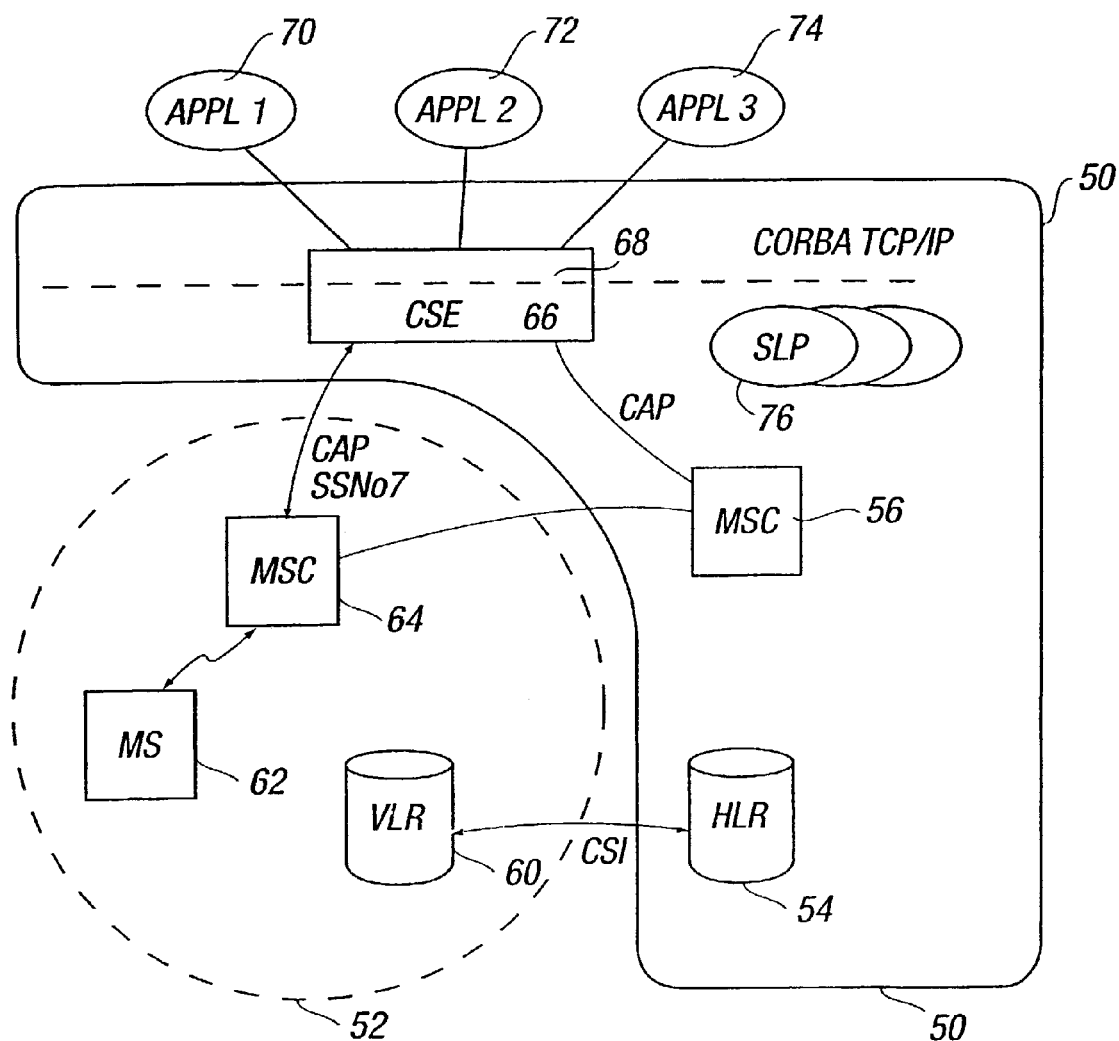
FIG. 7 shows a proposal for a network.

Reference is now made also to FIG. 7 which shows a previous proposal including a home network 50 and a visitor network 52. The home network is the user's usual network which is operated by the network operator to which the user subscribes. The visitor network is a network which may be operated by a different network operator. A roaming agreement will be in place between the visitor and home network to allow the subscriber to operate in both networks.

The home network has a home location register 54 and a first mobile services switching centre 56. The first mobile services switching centre 56 is connected to the CAMEL service environment using the CAP protocol of the SS7 standard.

The mobile station 62 may be in the visitors network 52. The visitors network 52 has a visitor location register 60. The visitor location register is arranged to obtain CSI information from the home location register 54 on the mobile station 62. The mobile station 62 is connected to a second mobile services switching centre 64 via a base station and base station controller which are not shown. The second mobile services switching centre 64 is also connected to the CAMEL service environment CSE 66 via a CAP connection which is in accordance with the SS7 standard. The first and second mobile services switching centres are connected to each other.

The home network 50 also has a number of service logic programs SLP 76. A service logic program is provided for each service. These are service providers within the network. The SLPs for the external services may be provided at the respective servers of the service providers. The service manager 12 may also be arranged by means of a SLP.

An open CORBA interface 68 is provided which allows external services to be attached, i.e. provided. In FIG. 7, three external service providers 70–74 are provided. The service providers are connected to the open CORBA interface. This interface uses the TCP/IP protocols of the SS7 standard.

In order for a connection to be established between an external application and for example the MSC, this will involve the CORBA interface 68 on top of the TCP/IP protocol and CAP connections between the CSE 66 and the mobile service switching centres.

The network used with embodiments of the present invention may include a packet data facility such as the general packet radio system (GPRS). GPRS nodes such as a serving GPRS support node 124 and a gateway GPRS support node 126 may be provided as shown in FIG. 6. These elements may be provided with an open interface 128 and 130 respectively. These open interfaces would be connected using an open service application connection to the application.

It should be appreciated that the manager described in relation to the first embodiment may be incorporated in the embodiment of FIG. 6.

The control characteristics reserved by a service for the communication can be determined by the service manager. The service manager may store information specific for the services.

Whilst embodiments of the present invention have been described in the context of a wireless telecommunications network, it should be appreciated that embodiments of the present invention are also applicable to wired networks and the like.

Embodiments of the present invention can be used in conjunction with any code division multiple access system as well as any other type of spread spectrum technique, frequency division or time division technique system as well as hybrids thereof.

It is also noted herein that while the above describes exemplifying embodiments of the invention, there are several variations and modifications which may be made to the disclosed solution without departing from the scope of the present invention as defined in the appended claims.

The invention claimed is:

1. A telecommunications system comprising:
   a switching point for triggering at least one controlling service of a plurality of controlling services for a communication; and
   a service manager connected to the switching point, said service manager being arranged to invoke said at least one controlling service and to determine based on information relating to control types required for said communication by said at least two controlling services if at least two controlling services of said plurality of controlling services can be provided for said communication, wherein a new controlling service can be started only if the one or more control types required for said communication by said new controlling service are not already reserved by a previously invoked controlling service,
   wherein a fixed set of control types are defined for the new controlling service, and
   wherein the information relating to the one or more control types required for said communication by the new controlling service includes information as to which one or more of said fixed set of control types are required for said communication, and is at least partly based on a response or responses given by the new controlling service during the invoking thereof.

2. A telecommunications system according to claim 1, wherein the service manager is arranged to invoke controlling services providing control for the communication in response to events associated with the communication, said event being received from the switching point.

3. A telecommunications system according to claim 2, wherein the service manager is arranged to maintain communication instance information before the control of the connection is returned to the switching point, said information being updated based on responses received from the invoked controlling services, and wherein the service manager is arranged to pass updated communication instance information to the switching point after the controlling services to be contacted on an event have been contacted.

4. A telecommunications system according to claim 1, wherein the service manager is arranged to maintain service specific information of events that are to be reported to the respective service.

5. A telecommunications system according to claim 1, wherein the service manager is arranged to invoke only such services for the communication that have control characteristics that are compatible with the control characteristics of one or more services of said plurality of controlling services previously invoked for the connection.

6. A telecommunications system according to claim 1, wherein the service manager is arranged to store information of the control characteristics of the controlling services.

7. A telecommunications system according to claim 1, wherein the service manager is arranged to receive information of the control characteristics of the controlling services from the respective services during invoking of the services.

8. A telecommunications system according to claim 1, wherein the service manager is arranged to determine the control characteristics of a controlling service based on a message from the service.

9. A telecommunications system according to claim 1, wherein the control characteristics of a controlling service depend on control types to be used for the communication by the service.

10. A telecommunications system according to claim 9, wherein the control types of the service are determined based on control operations accomplished by the controlling service and/or parameters used in the control operations.

11. A telecommunications system according to claim 1, wherein the service manager is arranged to invoke only controlling services for a communication initiated by a subscriber to the telecommunications system that are enabled by information that is specific for the subscriber.

12. A telecommunications system according to claim 11, wherein the subscriber specific information comprises a subscriber service profile.

13. A telecommunications system according to claim 11, further including selection means for selecting new controlling services from a list of available controlling services, wherein the list of available controlling services is based on information of the control characteristics reserved by previously selected controlling services.

14. A telecommunications system according to claim 1, wherein the switching point comprises a service switching point of an intelligent network.

15. A telecommunications system according to claim 1, wherein the switching point is provided at a user terminal subscribing to the telecommunications system, said switching point being arranged to trigger to the service manager in response to an event within the user terminal.

16. A telecommunications system according to claim 1, wherein the controlling services are provided by at least one service control node providing intelligent network services.

17. A telecommunications system according to claim 1, wherein the service manager is arranged to receive responses from the controlling services requested for the connection, to generate a combined response based on the received responses and to forward the combined response to the switching point.

18. A telecommunications system according to claim 1, wherein the service manager is arranged to control a single call state model within the switching point based on information from multiple controlling services.

19. A telecommunications system according to claim 1, further comprising an adapter between at least one of the controlling services and the service manager.

20. A telecommunications system according to claim 19, wherein the adapter is arranged to determine the control characteristics of said at least one controlling service based on a response from said at least one service.

21. A telecommunications system according to claim 19, wherein the adapter is arranged to determine control types required by the controlling service to be invoked, to attach information relating to the determined control types to a message received from said controlling service and to forward the modified message to the service manager.

22. A telecommunications system according to claim 1, wherein the service manager is arranged to invoke the controlling services in a predefined order.

23. A telecommunications system according to claim 1, wherein the service manager is implemented at the switching point.

24. A telecommunications system according to claim 1, wherein the telecommunication system comprises a cellular radio network.

25. A telecommunication system according to claim 24, wherein at least part of the information relating to the controlling services and/or the subscriber is stored in a centralised database implemented in the cellular network.

26. A telecommunication system according to claim 24, wherein the switching point comprises a switching node of the cellular radio network.

27. A telecommunications system according to claim 1, wherein an open service architecture interface is provided between said at least one controlling service and the switching point.

28. A telecommunications system according to claim 2, wherein at least one of the controlling services invoked by the service manager is provided from an external node.

29. A telecommunications system according to claim 28, wherein the interface between the external node and the controlling service is based on distributed object oriented technology.

30. An apparatus, comprising:
   means for establishing a first interface to a switching point of a telecommunications system;
   means for establishing a second interface to at least two controlling services of a plurality of controlling services providing control for connections via the telecommunications system; and
   means for determining based on information relating to control types required for the connection by said at least two controlling services if said at least two controlling services of said plurality of controlling services can be provided for the connection, said means being arranged to enable a new controlling service to be started only if the one or more control types required for the connection by said new controlling service are not already reserved by an already invoked controlling service,
   wherein a fixed set of control types are defined for the new controlling service; and
   wherein the information relating to the one or more control types required for the communication by the new controlling service includes information as to which one or more of said fixed set of control types are required for said connection, and is at least partly based on a response or responses given by the new controlling service during the invoking thereof.

31. An apparatus according to claim 30, said apparatus being arranged to invoke multiple controlling services to provide simultaneous control for the connection at the switching point.

32. An apparatus according to claim 30, wherein said apparatus is arranged to store service specific information as to the control characteristics of the respective controlling services.

33. An apparatus according claim 30, wherein the controlling services are provided by at least two external nodes providing at least one controlling service.

34. An apparatus according to claim 30, wherein the apparatus is further arranged to determine the order in which the requested controlling services are to be invoked.

35. An apparatus according to claim 30, wherein the apparatus is arranged to determine the control characteristics of a controlling service based on a message from the controlling service.

36. An apparatus according to claim 30, wherein the apparatus is arranged to receive responses from the controlling services requested for the connection, to generate a combined response based on the received responses and to forward the combined response to the switching point.

37. A method, comprising:
   initiating a communication via a telecommunications system;

invoking a first controlling service of a plurality of controlling services for the communication by a service manager, said first controlling service reserving at least one control type for providing control for the communication;

invoking a second controlling service of said plurality of controlling services; and determining by the service manager based on information of the control types required by said first and second controlling services for controlling the communication if said first and second controlling services can both be provided for the communication, wherein the second controlling service is started only if the one or more control types required for the communication by said second controlling service are not already reserved by the first controlling service, wherein a fixed set of control types are defined for the second controlling service, and wherein the information relating to the one or more control types required for the communication by the second controlling service includes information as to which one or more of said fixed set of control types are required for said communication, and is at least partly based on a response or responses from the second controlling service during the invoking thereof.

38. A method according to claim 37, wherein the first controlling service provides the service manager with information on the control characteristics the first controlling service reserves for the control of the communication.

39. A method according to claim 37, wherein the second controlling service provides the service manager with information on the control characteristics the second controlling service reserves for the control of the communication.

40. A method according to claim 38, wherein the information on the control characteristics is provided from the controlling service to the service manager as a response to the invoking of the controlling service.

41. A method according to claim 37, wherein the service manager maintains communication instance information before the control of the connection is returned to the switching point, updates the communication instance information based on responses received from the invoked services, and passes the updated communication instance information to the switching point after the service manager has contacted the controlling services to be invoked.

42. A method according to claim 41, wherein at least three controlling services are invoked, and information of the control characteristics of said at least three controlling services is combined.

43. A method according to claim 41, wherein the service manager provides intermediate information to the network element before the provision of the combined information.

44. A method according to claim 37, wherein the service manager determines the control characteristics based on a message received from a respective controlling service.

45. A method according to claim 37, wherein the control characteristics of a controlling service are based on control types to be issued for the communication by the controlling service.

46. A method according to claim 45, comprising:

determining the control types reserved by the controlling services;

storing information of the determined control types for the respective controlling services; and enabling invoking of requested controlling services based on the stored information of the control types.

47. A method according to claim 46, comprising the further steps of:

generating a list of available controlling services based on the stored information; and presenting the list for a user of the communication for selection.

48. A method according to claim 37, further comprising the steps of:

sending a response from the controlling service to be invoked to the service manager via an adapter;

determining by the adapter control types said controlling service reserves;

attaching by the adapter the determined control types to the response; and forwarding the modified response to the service manager.

49. A method according to claim 37, wherein the service manager invokes multiple controlling services providing control for the communication in response to a predetermined respective event.

50. A method according to claim 37, wherein the service manager determines based on information stored in association with the service manager the control characteristics reserved by the first controlling service.

51. A method according to claim 37, wherein the second controlling service or another new controlling service is not enabled to be started if at least one of the control characteristics reserved by said second controlling service or the other controlling service is incompatible with the control characteristics employed by the first controlling service or another controlling service that has already been started.

52. A method according to claim 50, wherein, if the second controlling service or the other new controlling service is not enabled, one or more of the following procedures is performed: the communication continues without initiating the new controlling service; the communication is cleared; and an error message is sent to the user of the communication.

53. A method according to claim 52, wherein, if the error message is sent to the user, the message indicates the controlling services already invoked for the communication.

54. A method according to claim 52, wherein, if the error message is sent to the user, the error message comprises one of: an unstructured message from a content server; a wireless application part push message from a content server; or an arbitrary content push message from a content server.

55. A method according to claim 37, wherein the service manager constructs a text, picture or voice message to the user of the communication based on the current service environment.

56. A method according to claim 55, wherein the current service environment comprises the services already invoked for the communication.

57. A method according to claim 56, wherein the current service environment comprises a controlling service that was not enabled for the communication because of the control characteristics already reserved by the already invoked controlling service or services.

58. A method according to claim 55, wherein the current service environment comprises the service profile that has been selected for the communication.

59. A method according to claim 55, wherein the message indicates the action or actions without which the controlling service can be enabled for the communication.

60. A method according to claim 55, wherein the message indicates the conditions which enable the controlling service that was not enabled in the first place for the communication.

61. A method according to claim 37, wherein the service manager is arranged to invoke the controlling services in a predefined order.

62. An apparatus, comprising:
- a first interface to a switching point of a telecommunications system;
- a second interface to at least two controlling services of a plurality of controlling services providing control for connections via the telecommunications system;
- wherein the apparatus is configured to determine based on information relating to control types required for the connection by said at least two controlling services if said at least two controlling services of said plurality of controlling services can be provided for the connection, and to enable a new controlling service to be started only if the one or more control types required for the connection by said new controlling service are not already reserved by an already invoked controlling service;
- wherein a fixed set of control types are defined for the new controlling service; and
- wherein the information relating to the one or more control types required for the communication by the new controlling service includes information as to which one or more of said fixed set of control types are required for said connection, and is at least partly based on a response or responses given by the new controlling service during the invoking thereof.

63. A computer program product comprising a computer readable storage structure embodying computer program code thereon for execution by a computer processor, wherein said computer program code comprises instructions for performing a method comprising:
- invoking a first controlling service of a plurality of controlling services for a communication a telecommunications system, said first controlling service reserving at least one control type for providing control for the communication,
- invoking a second controlling service of said plurality of controlling services,
- determining based on information of the control types required by said first and second controlling services for controlling the communication if said first and second controlling services can both be provided for the communication, and
- starting the second controlling service only if the one or more control types required for the communication by said second controlling service are not already reserved by the first controlling service,
- wherein a fixed set of control types are defined for said second controlling service, and
- wherein the information relating to the one or more control types required for the communication by the second controlling service includes information as to which one or more said fixed set of control types are required for said communication, and is at least partly based on a response or responses from the second controlling service during the invoking thereof.

* * * * *